United States Patent
Friesinger et al.

(10) Patent No.: US 11,509,404 B2
(45) Date of Patent: Nov. 22, 2022

(54) AUTOMATED CALIBRATION UNIT, FREQUENCY CONVERSION CIRCUIT AND METHOD OF PERFORMING CALIBRATION OF A TEST AND MEASUREMENT INSTRUMENT

(71) Applicant: Rohde & Schwarz GmbH & Co. KG, Munich (DE)

(72) Inventors: Maximilian Friesinger, Munich (DE); Jakob Hammer, Munich (DE); Werner Held, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 33 days.

(21) Appl. No.: 17/214,725

(22) Filed: Mar. 26, 2021

(65) Prior Publication Data

US 2022/0311522 A1    Sep. 29, 2022

(51) Int. Cl.
   *H04B 17/00* (2015.01)
   *H04B 17/11* (2015.01)
   *H04B 17/21* (2015.01)

(52) U.S. Cl.
   CPC ............. *H04B 17/11* (2015.01); *H04B 17/21* (2015.01)

(58) Field of Classification Search
   CPC ......... H04B 17/11; H04B 17/15; H04B 17/21
   See application file for complete search history.

(56) References Cited

U.S. PATENT DOCUMENTS

| 6,064,694 | A | 5/2000 | Clark et al. |
| 7,359,814 | B1 * | 4/2008 | Nakayama ........... G01R 35/005 |
| | | | 702/85 |
| 8,296,086 | B2 * | 10/2012 | Sternberg ............... H04B 17/21 |
| | | | 702/66 |

(Continued)

FOREIGN PATENT DOCUMENTS

DE    102006035827 A1    9/2007

OTHER PUBLICATIONS

Dunsmore, J., "Novel Method for Vector Mixer Characterization and Mixer Test System Vector Error Correction," Ageilent Technologies, IEEE Explore, 2020, 4 pages.

(Continued)

*Primary Examiner* — Tuan Pham
(74) *Attorney, Agent, or Firm* — Christensen O'Connor Johnson Kindness PLLC

(57) ABSTRACT

An automated calibration unit has several ports for connecting with respective ports of a test and measurement instrument to be calibrated. The automated calibration unit has a frequency conversion circuit that is non-linear and reciprocal in amplitude and phase. The automated calibration unit has at least one switching circuit with several switch states. The automated calibration unit is configured to selectively connect each one of the several ports to another one of the several ports depending on the switch state, thereby providing a through connection via the frequency conversion circuit. The automated calibration unit is configured to selectively connect each one of the several ports to at least one of several calibration standards respectively depending on the switch state. Further, a frequency conversion circuit and a method of performing calibration of a test and measurement instrument are described. Moreover, a method of absolute power calibration transfer is described.

18 Claims, 5 Drawing Sheets

(56) References Cited

U.S. PATENT DOCUMENTS 9,869,743 B2 * 1/2018 Leibfritz ................ G01R 27/04
2007/0143051 A1 6/2007 Nakayama et al.
2009/0092177 A1 4/2009 Dvorak et al.

OTHER PUBLICATIONS

Dunsmore, J. et al., "Comparison of Mixer Characterization Using New Vector Characterization Techniques," Ageilent Technologies, IEEE Explore, 2020, 4 pages.

Sternberg, B.K. and S.L. Dvorak, "Quasi-reciprocal mixer as an absolute vector signal standard at microwave frequencies," IET Science, Measurement and Technology, 2(4):258-267, 2008, 10 pages.

* cited by examiner

AUTOMATED CALIBRATION UNIT, FREQUENCY CONVERSION CIRCUIT AND METHOD OF PERFORMING CALIBRATION OF A TEST AND MEASUREMENT INSTRUMENT

FIELD OF THE DISCLOSURE

Embodiments of the present disclosure generally relate to an automated calibration unit calibrating a test and measurement instrument. Further, embodiments of the present disclosure relate to a frequency conversion circuit for use in automated calibration. Moreover, embodiments of the present disclosure relate to a method of performing calibration of a test and measurement instrument.

BACKGROUND

In telecommunication and other radio frequency (RF) applications, it is often necessary to convert a signal from one frequency to another. Hence, frequency conversion circuits like mixers or frequency converters are used to convert a specific frequency to another one, for example from a higher frequency to a lower frequency or vice versa. Electrical characteristics of these circuits used in such applications or systems have to be known for developing and modelling the systems.

A tool for measuring such electrical characteristics, for example amplitude and phase properties, is a vector network analyzer (VNA). When performing such measurement, the frequency conversion circuit or rather the device comprising the frequency conversion circuit is used as a device under test (DUT) that is connected to the VNA via respective ports of the VNA, namely VNA ports.

While the VNA allows determining characteristics of the DUT, the VNA also comprises components like connectors, cables and other means, e.g. circuits, causing systematic errors in the measurement. This requires the VNA—or the entire measurement setup—to be calibrated in order to account for such errors and, thus, to allow precise measurements of the DUT.

In some embodiments, for frequency conversion circuits phase and group delay measurements are of interest and, thus, errors in this regard have to be accounted for in the calibration of the VNA. Individual and separately formed devices such as a device for determining phase reference, a discrete calibration mixer and a separate calibration unit might be used that have to be connected to the respective VNA ports manually and subsequently. However, such individual devices are difficult to handle for customers and are prone to handling failures, yielding an incorrect calibration of the VNA.

Accordingly, there is a need for an easier calibration of a VNA that accounts for errors with respect to phase and group delay.

SUMMARY

Embodiments of the present disclosure provide an automated calibration unit for calibrating a test and measurement instrument. The automated calibration unit has several ports for connecting with respective ports of the test and measurement instrument to be calibrated. The automated calibration unit has a frequency conversion circuit that is non-linear and reciprocal in amplitude and phase. The automated calibration unit has at least one switching circuit with several switch states. The automated calibration unit is configured to selectively connect each one of the several ports to another one of the several ports depending on the switch state of the switching circuit, thereby providing a through connection via the frequency conversion circuit. The automated calibration unit is configured to selectively connect each one of the several ports to at least one of several calibration standards respectively depending on the switch state of the switching circuit.

Accordingly, an automated calibration unit is provided that can be used for automatically calibrating a test and measurement instrument like a vector network analyzer (VNA). The automated calibration unit—it might be provided as a box or in a box—has several ports, which are to be used to connect the unit to respective ports of the test and measurement instrument, e.g. the ports of the VNA, also called VNA ports. The automated calibration unit has a minimum number of two that might be assigned to two ports of the test and measurement instrument. However, also three, four or even five ports can be provided that might be connected with the test and measurement instrument.

Further, the automated calibration unit has a frequency conversion circuit and a switching circuit. Thus, the automated calibration unit is configured to allow each one of the several ports to be connected to another one of the several ports, thereby providing a through connection via the frequency conversion circuit. Accordingly, the switching circuit has different switch states, wherein a different connection of the at least two ports may be established in each of the switch states. However, the through connection via the frequency conversion circuit is established in a specific switch state of the switching circuit.

Generally, this allows the use of a through, for example an unknown through, calibration standard.

The frequency conversion circuit of the automated calibration unit typically comprises three ports. A first port of these ports is used to connect the frequency conversion circuit to a source that provides a local oscillator signal (LO signal). The respective source may be a local oscillator, e.g. one of the test and measurement instrument. However, the test and measurement instrument may also provide a signal that is used as a LO signal.

The other two ports are ports that are used to process the frequency conversion circuit to two different frequency signals, a signal with a lower frequency and a signal with a higher frequency. Typically, the lower frequency is called intermediate frequency (IF) and the higher frequency is called radio frequency (RF). In some embodiments, the frequency conversion circuit inter alia allows converting the lower frequency to the higher frequency by using the LO signal, which relates to an up-conversion. Hence, the signal with the intermediate frequency (IF) is an input signal, whereas the signal with the radio frequency (RF) is the output signal. Furthermore, the frequency conversion circuit also allows converting the higher frequency to the lower frequency by using the LO signal, which relates to a down-conversion. Hence, the signal with the radio frequency (RF) is an input signal, whereas the signal with the intermediate frequency (IF) is the output signal.

In any case, the ports of the unit can be connected depending on the respective switch state such that, for example, a first port is connected to the port for the IF signal and a second port is connected to the port for the RF signal. With more than two ports, further connections of the ports via the frequency conversion circuit are possible.

The frequency conversion circuit is non-linear and reciprocal in amplitude and phase. This means that the frequency conversion circuit is reciprocal with regard to the signals processed.

This can generally expressed as follows:

$$\begin{pmatrix} b_{RF} \\ b_{IF} \end{pmatrix} = SM \cdot \begin{pmatrix} a_{RF} \\ a_{IF} \end{pmatrix},$$

wherein $a_{RF}$ and $a_{IF}$ are the waves of signals running towards the frequency conversion circuit and $b_{RF}$ and $b_{IF}$ are the waves of signals running away from the frequency conversion circuit, respectively, wherein the index RF relates to the radio frequency and the index IF relates to the intermediate frequency.

SM corresponds to a matrix that describes the respective properties of the frequency conversion circuit, wherein the matrix has several entries that can be expressed as follows:

$$SM = \begin{pmatrix} S11 & S12 \\ S21 & S22 \end{pmatrix} = \begin{pmatrix} \Gamma_{RF} & L_{RFIF} \\ L_{IFRF} & \Gamma_{IF} \end{pmatrix}$$

$\Gamma_{RF}$ and $\Gamma_{IF}$ relate to the reflection factors at the RF port and IF port, respectively. Further, $L_{RFIF}$ relates to the characteristics of the frequency conversion circuit in the case of down-conversion (from RF to IF) and $L_{IFRF}$ relates to the characteristics of the frequency conversion circuit in the case of up-conversion (from IF to RF). Moreover, $L_{RFIF}=L_{IFRF}$ substantially applies for the frequency conversion circuit since the frequency conversion circuit is reciprocal in amplitude and phase. However, minor deviations from the above-mentioned equation may take place.

Therefore, the reciprocal frequency conversion circuit of the automated calibration unit ensures that its characteristics are the same irrespective thereof if the frequency conversion circuit is used for down-conversion or up-conversion.

Generally, it is to be noted that the reciprocal frequency conversion means allows providing a phase reference between RF and IF, and determining the transmission response from the round-trip transmission response.

Furthermore, the automatic calibration unit is configured to allow each one of the several ports to be connected to at least one of several calibration standards, wherein the calibration standards are different from the through or unknown through calibration standard mentioned before. In some embodiments, this depends on the respective switch state of the switching circuit. Each of the ports can be connected with the several calibration standards subsequently, wherein each connection is associated with a certain switch state of the switching circuit.

The different calibration standards can be used to perform an OSM calibration of the respective port.

An aspect provides that the switching circuit is configured to selectively connect one of the several ports to a local oscillator port of the frequency conversion circuit. In other words, each one of the several ports of the automated calibration unit may be connected to the local oscillator port of the (internal) frequency conversion circuit, which depends on the respective switching state of the switching circuit. The local oscillator port may correspond to a first port of the frequency conversion circuit that has three ports in total. The frequency conversion circuit is used to convert an input signal with regard to frequency, wherein a signal received via the local oscillator port is used, e.g. a local oscillator signal. The respective signal received via the local oscillator port may originate from the test and measurement instrument to be calibrated.

Furthermore, the frequency conversion circuit may have a radio frequency (RF) port and an intermediate frequency (IF) port, and wherein the frequency conversion circuit that is non-linear and reciprocal in amplitude and phase with respect to a signal transmission from the radio frequency (RF) port to the intermediate frequency (IF) port and vice versa. The IF port and the RF port may correspond to a second port and a third port of the frequency conversion circuit. However, the frequency conversion circuit is reciprocal such that the second port may act as the IF port or rather the RF port depending on the operation state of the frequency conversion circuit or rather the input signal. In a similar manner, the third port may act as the IF port or rather the RF port depending on the operation state of the frequency conversion circuit or rather the input signal.

Generally, the frequency conversion circuit may have three different ports, wherein the second port and the third port correspond to an input port and an output port, respectively.

Another aspect provides that the frequency conversion circuit has a down-conversion operational state and an up-conversion operational state. The frequency conversion circuit can be used to up-convert an input signal, e.g. an IF signal to an RF signal. However, the frequency conversion circuit may also down-convert an input signal, e.g. an RF signal to an IF signal. In both operation states, the frequency conversion circuit uses the LO signal for converting purposes. In the down-conversion operational state, the RF signal corresponds to the input signal, whereas the IF signal corresponds to the input signal in the up-conversion operational state.

A further aspect provides that the automated calibration unit comprises a detector circuit. The automated calibration unit is configured to perform a power calibration of the test and measurement instrument based on information obtained from the detector circuit. For instance, a RMS detector is provided that is associated with the ports such that the ports of the test and measurement instrument connected thereto can be calibrated with regard to their power characteristics.

Moreover, the automated calibration unit may have a feedback line that is configured to provide a feedback, e.g. to the test and measurement instrument to be calibrated. The feedback can be used to adjust the port(s) of the test and measurement instrument for any occurring loss in the automated calibration unit such that those loss(es) can be compensated during the calibration of the test and measurement instrument.

Another aspect provides that the several calibration standards are an open calibration standard, a short calibration standard and a match calibration standard. Hence, an OSM calibration can be performed accordingly. The open calibration standard means that the respective port is left open (an open circuit without any termination or load is provided). The short calibration standard means that the respective port is short-circuited, e.g. with ground. The match calibration standard means that the respective port is terminated with a defined load or resistance, e.g. 50 Ohms. In order to allow these different calibration standards to be connected to or provided at the respective port, the respective switching circuit is provided.

It is of particular advantage if all three calibration standards—open, short and match—are provided at each port. Hence, several of the ports of the test and measurement instrument, which are connected with the ports of the automated calibration unit, can be calibrated with respect to the OSM calibration simultaneously, for example with respect to the same calibration standard simultaneously.

Alternatively, the switching circuit may ensure to connect a first one of the several ports with the open calibration standard, a second one of the several ports with the short calibration standard, and a third one of the several ports with the match calibration standard simultaneously. Once, the respective calibration at the different ports is completed, all three ports are re-connected with a different calibration standard, thereby reducing the overall time required for performing the OSM calibration of the test and measurement instrument.

Generally, the switching provides different switch states to allow the different connections to either nothing (open), ground (short), a load (match) or a further electrical line that is connected to the frequency conversion circuit in order to provide the (unknown) through calibration standard. The different switch states can, for example, be chosen or switched automatically. In some embodiments, a control circuit is provided.

In some embodiments, the switching circuit is configured to automatically switch between the different switch states in order to selectively connect a respective port of the several ports with the several calibration standards one after the other subsequently, thereby ensuring an OSM calibration. As mentioned above, the switching circuit may perform the respective switching on its own. Alternatively, the switching circuit is controlled by a control circuit that may interact with a processing circuit, for example an external device such as a computer.

The respective port may be connected to another of the several ports via the frequency conversion circuit, thereby establishing the through connection between the respective port and the another port. Thus, the port of the test and measurement instrument, which is calibrated with regard to the OSM calibration, is further calibrated in order to obtain an UOSM calibration, namely an Unknown Open Short Match calibration, since the respective port is connected with the frequency conversion circuit.

Another aspect provides that the automated calibration unit has a single housing that encompasses the frequency conversion circuit, the switching circuit and the several calibration standards. Accordingly, the different calibration standards, namely open, short, match and (unknown) through, can be provided in a single housing or rather box. Thus, all of the calibration standards can be used in automated manner to measure errors and calibrate the test and measurement instrument that is connected with the one-box solution.

In some embodiments, an amplitude and phase relation between the ports of the test and measurement instrument can be identified, which ensures to correctly measure the frequency conversion characteristic of a DUT. In some embodiments, this is achieved by using the automated calibration unit with the reciprocal frequency conversion circuit and the other calibration standards, thereby providing an automated UOSM calibration of the test and measurement instrument.

The frequency conversion circuit may comprise an input port for receiving an input signal and an output port for outputting an output signal. The input signal may relate to an intermediate frequency (IF) signal that is up-converted to a radio frequency (RF) signal that is outputted as the output signal. Alternatively, the input signal may relate to a radio frequency (RF) signal that is down-converted to an intermediate frequency (IF) signal that is outputted as the output signal.

Another aspect provides that a respective attenuator is associated with the input port and the output port. The respective attenuators have the same attenuation level such that harmonics are suppressed that would convert up or down to the same frequency of the output signal. Accordingly, a resulting group delay variation can be reduced since the attenuators suppress the harmonics or rather higher order frequency component(s) such that ripples on the group delay are reduced that might occur.

Moreover, embodiments of the present disclosure relate to a frequency conversion circuit for use in automated calibration. The frequency conversion circuit has three ports, wherein a first port is a local oscillator port configured to receive a local oscillator signal. Further, a second port and a third port are configured to process an intermediate frequency signal and a radio frequency signal, respectively. The frequency conversion circuit is non-linear and reciprocal in amplitude and phase. In addition, a respective attenuator is associated with each of the second port and the third port. The respective attenuators have the same attenuation level such that harmonics are suppressed that would convert up or down to the same frequency of the intermediate frequency signal and the radio frequency signal, respectively.

Accordingly, the second port may relate to an input port, whereas the third port may relate to an output port. The second port or rather the input port can be fed with an RF signal or rather an IF signal. Further, the third port or rather the output port may output an IF signal or rather an RF signal. The frequency conversion circuit processes the local oscillator (LO) signal received via its first port for converting the input signal received via its input port, namely its second port.

In some embodiments, the frequency conversion circuit can be used in or be provided in an automated calibration unit, for example the one as described above.

Further, the frequency conversion circuit is non-linear and reciprocal in amplitude and phase, wherein the respective attenuators suppress any upcoming harmonics when performing the frequency conversion to the IF or rather RF.

In order to ensure a wide operating frequency range of the frequency conversion circuit, no frequency limiting components such as diplexers, filters, baluns or amplifiers are used at any of the ports.

In some embodiments, the reciprocal frequency conversion circuit has a reciprocal device that non-linearly creates at least one higher order frequency component that is different to the intermediate frequency signal or the radio frequency signal. The respective higher order frequency components generated by the respective reciprocal device are attenuated by the attenuators that are associated with the second port and the third port, respectively.

The reciprocal device may be a diode, a transistor and/or a thermal element, providing the non-linearity of the non-linear frequency conversion circuit with regard to the frequency components. However, an amplifier cannot be used as the reciprocal device.

Another aspect provides that a further attenuator is associated with the first port of the frequency conversion circuit. Hence, all ports of the frequency conversion circuit are associated with a respective attenuator. The further attenuator may also have the same attenuation level.

Moreover, embodiments of the present disclosure also relate to a method of performing calibration of a test and measurement instrument by means of an automated calibration unit having several ports, comprising the following steps:

connecting ports of the automated calibration unit with ports of the test and measurement instrument to be calibrated;

in a first calibration step, performing an OSM calibration by subsequently connecting a respective port of the several ports of the automated calibration unit with an open calibration standard, a short calibration standard and a match calibration standard, wherein the different calibration standards are connected with the respective port by means of a switching circuit of the automated calibration unit; and in a second calibration step, connecting the respective port and another port of the automated calibration unit with a frequency conversion circuit of the automated calibration unit by means of the switching circuit, wherein the frequency conversion circuit is non-linear and reciprocal in amplitude and phase, and performing an unknown through calibration by using the frequency conversion circuit that is used as an unknown through calibration standard.

Accordingly, the test and measurement instrument can be calibrated appropriately by means of a UOSM calibration method that is performed in an automated matter since the automated calibration unit with several ports is used, which are connected to respective ports of the test and measurement instrument. The automated calibration unit ensures that the respective ports of the test and measurement instrument can be calibrated in a successive manner, thereby calibrating the entire test and measurement instrument accordingly.

Preferably, the automatic calibration unit and/or the frequency conversion circuit described above can be used during the method of performing calibration of the test and measurement instrument.

Moreover, a method of absolute power calibration transfer at a test and measurement instrument, the method comprising the steps of:

determining a system error correction for a low frequency port of the test and measurement instrument and determining a system error correction for a high frequency port of the test and measurement instrument;

connecting a frequency conversion circuit with the low frequency port and the high frequency port of the test and measurement instrument, wherein the frequency conversion circuit is reciprocal in amplitude and phase;

performing an unknown through measurement by means of the frequency conversion circuit connected with the test and measurement instrument, thereby obtaining a measurement result;

performing an absolute power measurement at the low frequency port of the test and measurement instrument, thereby obtaining a first absolute amplitude normalization factor associated with the low frequency port of the test and measurement instrument; and transferring the first absolute amplitude normalization factor to a second absolute amplitude normalization factor associated with the high frequency port of the test and measurement instrument by using the measurement result obtained into account.

Accordingly, a coaxial power measurement, which is done accurately and fast, can be transferred to an arbitrary frequency, e.g. a microwave frequency. In some embodiments, the coaxial power measurement done at the low frequency port is transferred to the high frequency port of the test and measurement instrument. Hence, power correction of wave quantities can be done easily at each port, for example the high frequency ports, as the absolute amplitude normalization factor can be determined.

Usually, a power meter measurement is required at all ports of the test and measurement instrument. However, this is not feasible for high frequencies, as the power meters are typically available for frequencies lower than 110 GHz. Thus, only thermal power sensors are available for microwave frequencies, e.g. microwave frequencies in the mm-wave range. The thermal sensors however require long integration times and which cannot be calibrated in a traceable way, resulting in an inaccurate calibration.

The absolute power measurement performed at the low frequency port of the test and measurement instrument can be done by means of a power meter, as the low frequency port is used for processing signals with frequencies lower than 110 GHz such that a power meter measurement is feasible for this port.

Generally, the system error correction may be provided by means of a so-called Q-matrix that encompasses correction terms used for correcting uncorrected measurement values. For instance, the Q-matrix may be provided for a one-port system, as the respective Q-matrix can be provided for each port of the test and measurement instrument separately. Accordingly, the matrix elements relate to those for a one-port error correction.

In some embodiments, the low frequency port may relate to an intermediate frequency (IF) port of the test and measurement instrument, whereas the high frequency port may relate to a radio frequency (RF) port of the test and measurement instrument.

The system error correction determined at the respective ports individually corresponds to a 1-port system error correction, whereas the unknown through measurement is associated with a 2-port system error correction.

An aspect provides that the measurement result obtained by performing the unknown through measurement corresponds to a ratio of the normalization factors associated with the low frequency port and the high frequency port of the test and measurement instrument. Hence, the ratio between the normalization factors is obtained, wherein the ports are at different frequencies as described above, namely a low frequency port and a high frequency port.

An aspect provides that the switching circuit subsequently connects the different calibration standards with the respective port automatically in the first calibration step, and wherein the respective port is connected with the frequency conversion circuit automatically in the second calibration step. The switching circuit may be controlled by a control circuit, for example a separately formed one. For instance, a computer or rather processing circuit may interact with the automated calibration unit in order to perform the respective switching such that the different switch states of the switching circuit are obtained.

Further, an absolute calibration performed for a low frequency port can be transferred to a high frequency port. Thus, the respective calibration allows to transfer an absolute calibration performed for a low frequency port, e.g. an IF port, to a high frequency port, e.g. an RF port. Therefore, the overall time required for performing the calibration can be reduced. In some embodiments, the absolute calibration can be done by the method described above for performing the absolute power calibration transfer.

Therein and in the following, the term "module" is understood to describe suitable hardware, suitable software, or a combination of hardware and software that is configured to have a certain functionality. The hardware may, inter alia, comprise a CPU, a GPU, an FPGA, an ASIC, or other types of electronic circuitry.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
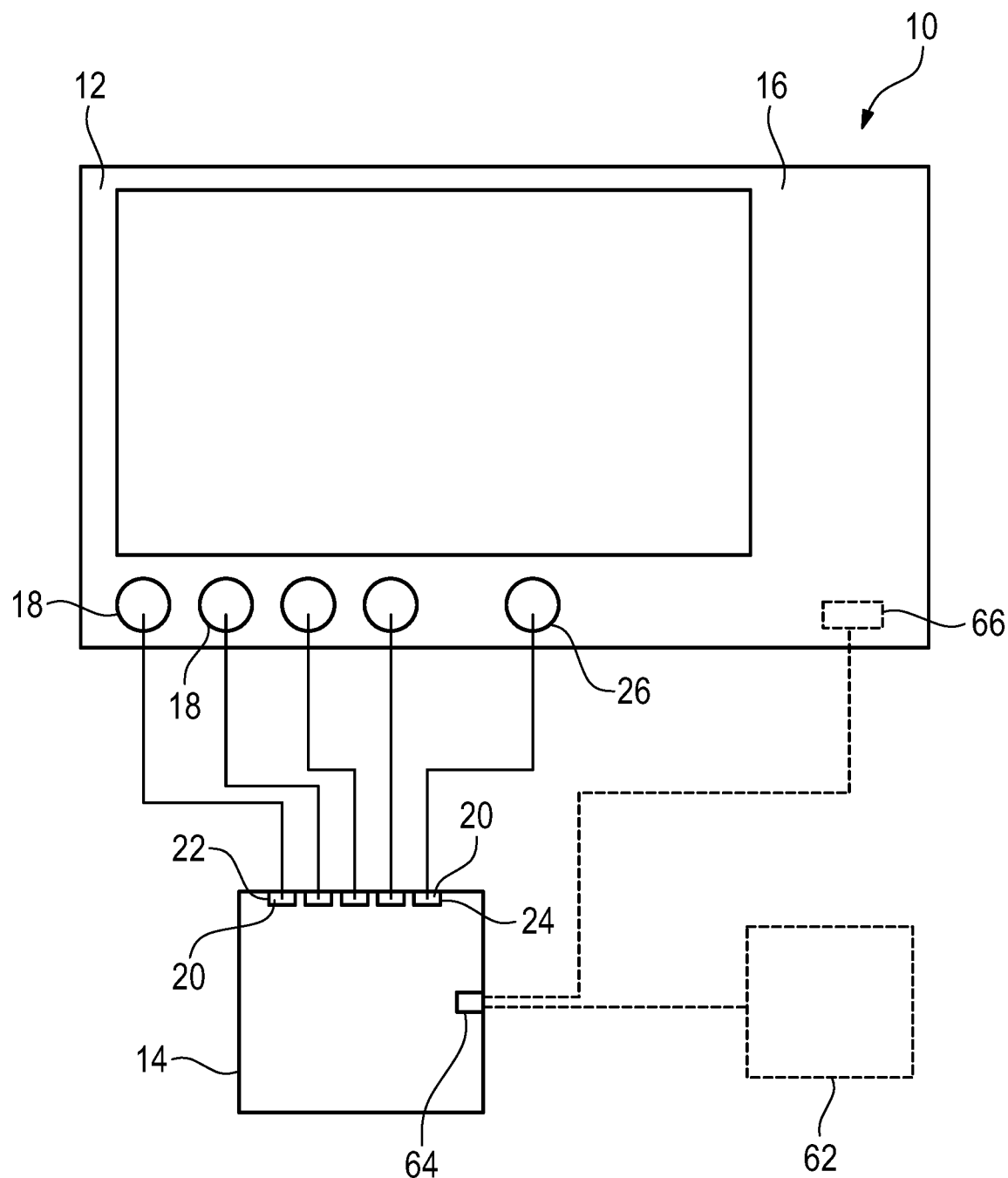
FIG. 1 shows a system with a test and measurement instrument and an automated calibration unit according to the present disclosure.

FIG. 1 shows a system 10 that comprises a test and measurement instrument 12 and an automated calibration unit 14 that are connected with each other.

In the shown embodiment, the test and measurement instrument 12 corresponds to a network analyzer, for example a vector network analyzer.

The test and measurement instrument 12 has a housing 16 at which several ports 18 are provided, e.g. VNA ports. The respective ports 18 can be used to output and/or receive a signal.

As shown in FIG. 1, the test and measurement instrument 12 is connected with the automated calibration unit 14 via the ports 18, wherein the automated calibration unit 14 also has several ports 20.

The several ports 20 of the automated calibration unit 14 can be used to receive a signal provided by the test and measurement instrument 12 or rather to forward a signal to the test and measurement instrument 12.

Generally, the automated calibration unit 14 is used to perform a calibration of the test and measurement instrument 12 in an automatic manner. In some embodiments, a so-called UOSM calibration is performed by means of the automated calibration unit 14 as will be described later in more detail.

Figure 2:
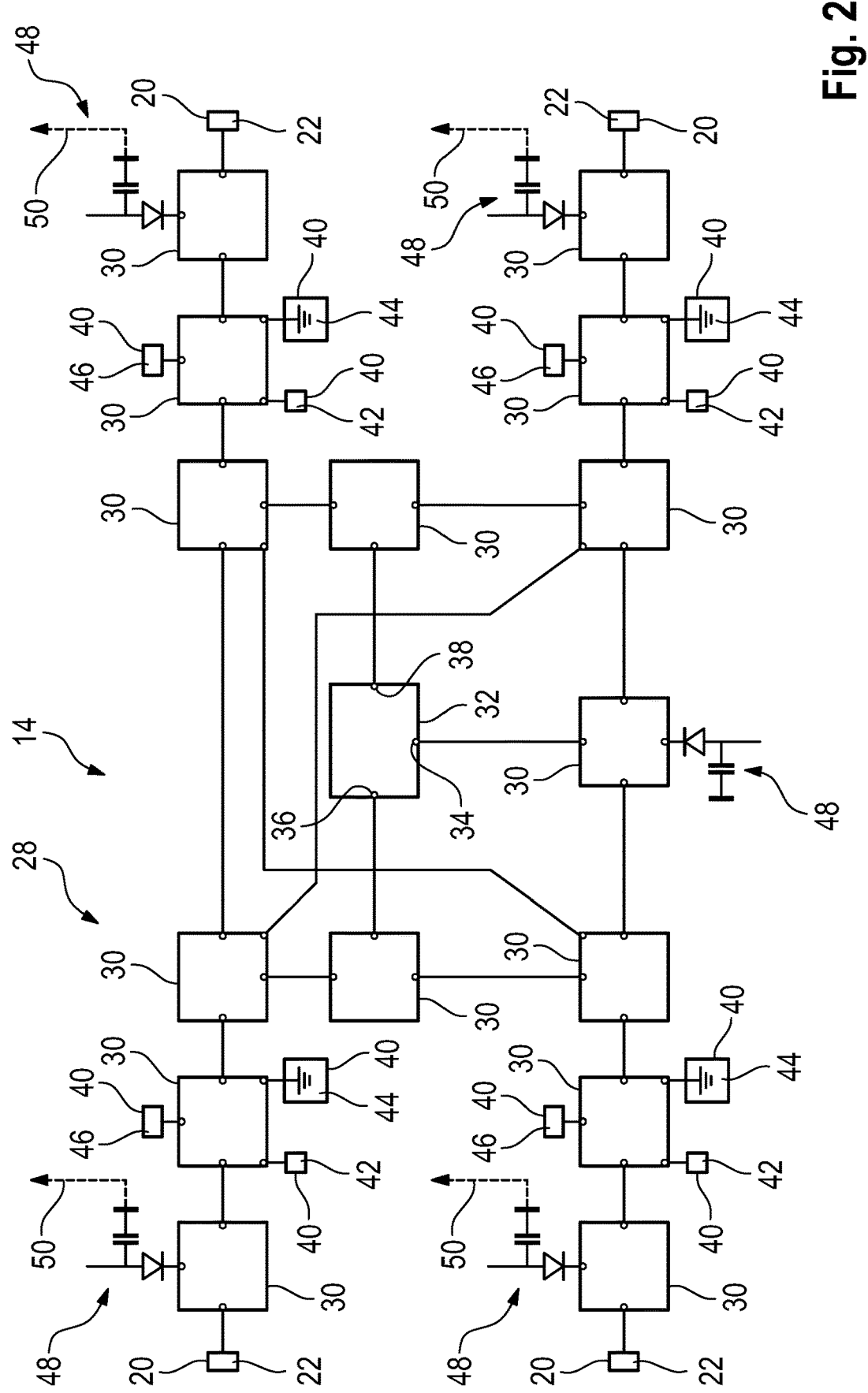
FIG. 2 shows a schematic overview of the automated calibration unit shown in FIG. 1.

The automated calibration unit 14 is shown in FIG. 2 in more detail, particularly the internal circuitry.

In the shown embodiment, the automated calibration unit 14 has five ports 20 in total, which are used to connect the automated calibration unit 14 to the respective ports 18 of the test and measurement instrument 12.

In some embodiments, the automated calibration unit 14 has four regular ports 22 as well as one specific port 24, wherein the regular ports 20 are connected with the ports 18 of the test and measurement instrument 12 to be calibrated, whereas the specific port 24 may be connected to a specific local oscillator port 26 of the test and measurement instrument 12 or rather a local oscillator itself.

In addition, the automated calibration unit 14 has at least one switching circuit 28 that is associated with each of the ports 20 of the automated calibration unit 14, for example each of the regular ports 22.

As shown in FIG. 2, the switching circuit 28 has several switching circuit portions 30 used to selectively interconnect different components as will be described later in more detail.

Furthermore, the automated calibration unit 14 comprises a frequency conversion circuit 32 that is non-linear and reciprocal in amplitude and phase.

The frequency conversion circuit 32 has a first port 34 that corresponds to a local oscillator port for receiving a signal used as a local oscillator signal by the frequency conversion circuit 32. Moreover, the frequency conversion circuit 32 comprises a second port 36 and a third port 38 that correspond to an input port and an output port, respectively.

In general, the frequency conversion circuit 32 is selectively connected with all ports 20, for example the regular ports 22, via the switching circuit 28, namely the several switching circuit portions 30.

In some embodiments, each of the ports 20 can be connected with the first port 34 of the frequency conversion circuit 32.

Further, each of the ports 20 can be connected with the second port 36 of the frequency conversion circuit 32.

Moreover, each of the ports 20 can be connected with the third port 38 of the frequency conversion circuit 32.

Accordingly, a flexible integration of the frequency conversion circuit 32 can be ensured, as the switching circuit 28 has several different switch states that allow the respective connections.

In the respective switch states of the switching circuit 28, only a dedicated number of the ports 20 is connected with the frequency conversion circuit 32.

Furthermore, it is also possible that only a dedicated number of all ports 20 may be connected with the first port 34, the second port 36 or rather the third port 38 of the frequency conversion circuit 32.

The respective dedicated number may differ for the different ports 34-38 of the frequency conversion circuit 32.

For instance, only two of the several regular ports 22 can be used for connecting with the first port 34 of the frequency conversion circuit 32, whereas three of the several regular ports 22 can be used for connecting with the second port 36 of the frequency conversion circuit 32.

The frequency conversion circuit 32 can be connected with two of the several ports 20, thereby establishing an (unknown) through connection between these two ports 20 selected depending on the respective switch state. Hence, an unknown through calibration can be done by means of the automated calibration unit 14 while providing a connection of two of the several ports 20 with the second port 36 and the third port 38 of the frequency conversion circuit 32.

Generally, the frequency conversion circuit 32 has a radio frequency (RF) port and an intermediate frequency (IF) port, which may be associated with the second port 36 and the third port 38, respectively. In some embodiments, this depends on the signal inputted and/or the operational state of the frequency conversion circuit 32. Hence, the frequency conversion circuit 32 has a down-conversion operational state, in which an RF signal is converted into an IF signal by using the signal received via the first port 34, and an up-conversion operational state, in which an IF signal is converted into an RF signal by using the signal received via the first port 34.

As mentioned above, the frequency conversion circuit 32 is non-linear and reciprocal in amplitude and phase with respect to a signal transmission from the radio frequency (RF) port to the intermediate frequency (IF) port and vice versa Moreover, the switching circuit 28 can selectively connect one of the several ports 20 to the first port 34, namely the local oscillator port, of the frequency conversion circuit 32. Thus, the respective signal provided at the port 20 selected is used for frequency conversion.

FIG. 2 also shows that several calibration standards 40 are provided, namely an open calibration standard 42, a short calibration standard 44 (i.e., there is provided connection to ground), a match calibration standard 46 (i.e., there is provided connection to a specified load or resistance of, e.g., 50 Ohms).

As shown, the respective calibration standards 40 are also selectively connectable with the respective port(s) 20 by means of the switching circuit 28, namely a corresponding switching circuit portion 30.

Accordingly, the automated calibration unit 14 is configured to selectively connect each one of the several ports 20 to at least one of several calibration standards 40 respectively depending on the switch state of the switching circuit 28.

The automated calibration unit 14 may comprise one set of calibration standards 40 such that the respective ports 20 can be selectively connected to the same calibration standards 40 depending on the switch state of the switching circuit 28.

Alternatively, each port 20 is associated with its own set of calibration standards 40 as shown in FIG. 2.

Generally, the switching circuit 28 is configured to automatically switch between the different switch states in order to selectively connect a respective port of the several ports 20 with the several calibration standards 40 one after the other subsequently, thereby ensuring an OSM calibration of the respective port 20. This means that one of the several ports 20 is subsequently connected with the open calibration standard 42, the short calibration standard 44, and the match calibration standard 46. Hence, the port 18 of the test and measurement instrument 12 connected with the respective port 20 is calibrated according to the OSM calibration.

This is repeated for all ports 20 such that all ports 18 of the test and measurement instrument 12 are calibrated according to the OSM calibration.

Moreover, the respective port 20 associated with the port 18 of the test and measurement instrument 12, which is calibrated according to the OSM calibration, is connected to another of the several ports 20 via the frequency conversion circuit, thereby establishing the through connection between the respective port and the another port.

As shown in FIG. 2, the automated calibration unit 14 also comprises a detector circuit 48 associated with a respective port 20. The automated calibration unit 14 is configured to perform a power calibration of the test and measurement instrument 12 based on information obtained from the detector circuit 48. The detector circuit 48 may comprise a root means square (RMS) detector.

Moreover, a feedback line 50 that is configured to provide a feedback, e.g. to the test and measurement instrument 12. The feedback can be used to adjust the port(s) 18 of the test and measurement instrument 12 for occurring loss(es) in the automated calibration unit 14. Those loss(es) can be compensated during the calibration of the test and measurement instrument 12.

As shown in FIG. 1, each of the regular ports 22 is established and associated with similar components.

Thus, each of the several regular ports 22 is connected to a switching circuit portion 30, e.g. a connection circuit, via which it is connected with switching circuit 28. The switching circuit portion 30 may also be used to provide power calibration at the port 18 of the test and measurement instrument 12 connected with the respective port 22. The switching circuit 28 is configured such that the respective port 22 can selectively be connected with one of the following: the open calibration standard 42, the short calibration standard 44, the match calibration standard 46, and a further switching circuit portion 30.

As mentioned above, the automated calibration unit 14 has the frequency conversion circuit 32, which has the three ports 34, 36, 38. The first port 34 is used to connect the frequency conversion circuit 32 to a local oscillator (LO) signal. The other two ports 36, 38 are ports used to connect the frequency conversion circuit 32 to two lines processing signals having different frequencies, e.g. a signal with a lower frequency and a signal with a higher frequency. By means of example, the second port 36 is connected to a line processing a signal of lower or intermediate frequency such that the second port 36 relates to an IF port, whereas the third port 38 is connected to a line processing a signal with higher or radio frequency such that the third port 38 relates to an RF port.

Figure 5:
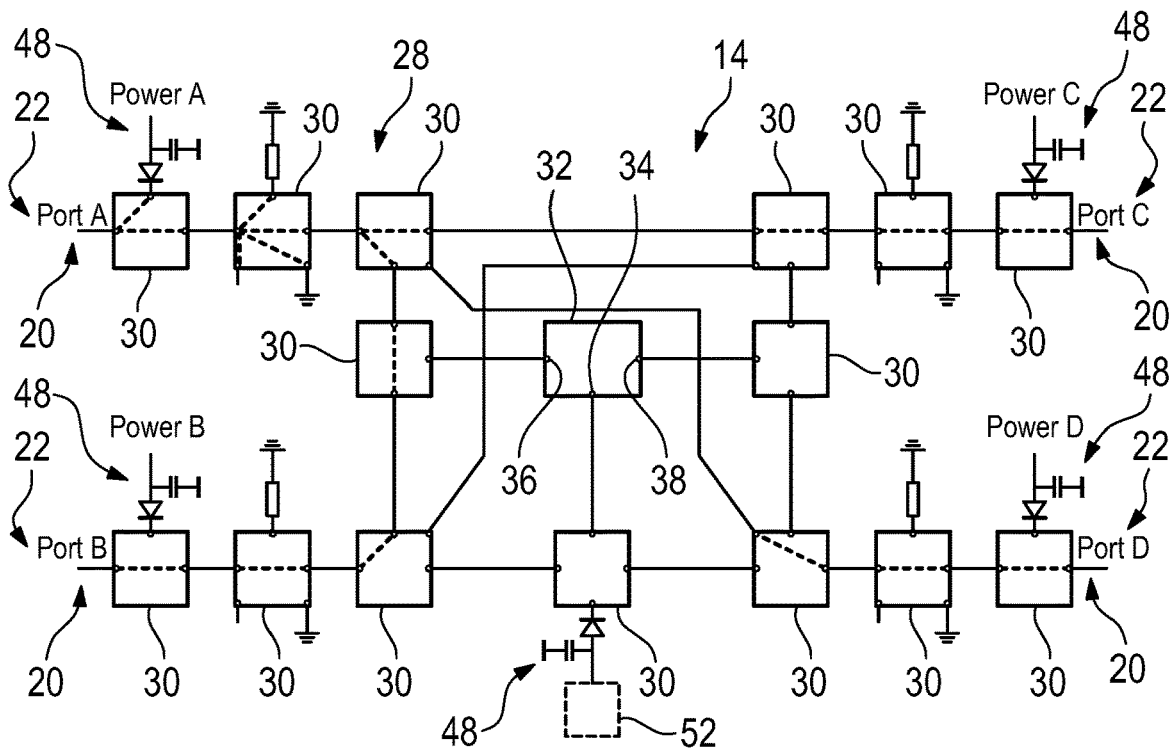
FIG. 5 shows the schematic overview of the automated calibration unit in a non-frequency converting mode.

In FIG. 5, a respective switch state is shown that concerns a non-frequency converting through, as the frequency conversion circuit 32 is not connected to any of the regular ports 20 of the automated calibration unit 14.

Furthermore, FIG. 5 reveals that an internal port 52 is provided that cannot be accessed by the customer or rather user. However, the internal port 52 may be used for power detection at the first port 34 of the frequency conversion circuit 32, namely the local oscillator port.

Figure 6:
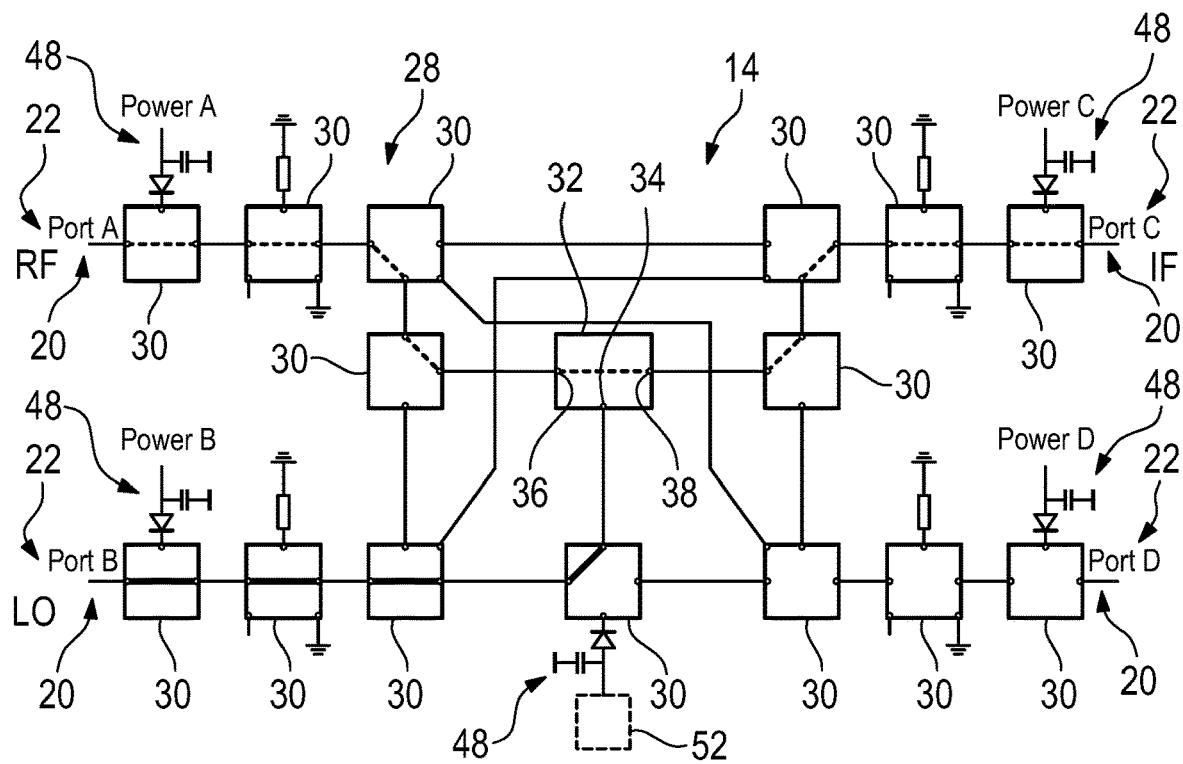
FIG. 6 shows the schematic overview of the automated calibration unit in an exemplary first switch state in a frequency converting mode.
Figure 7:
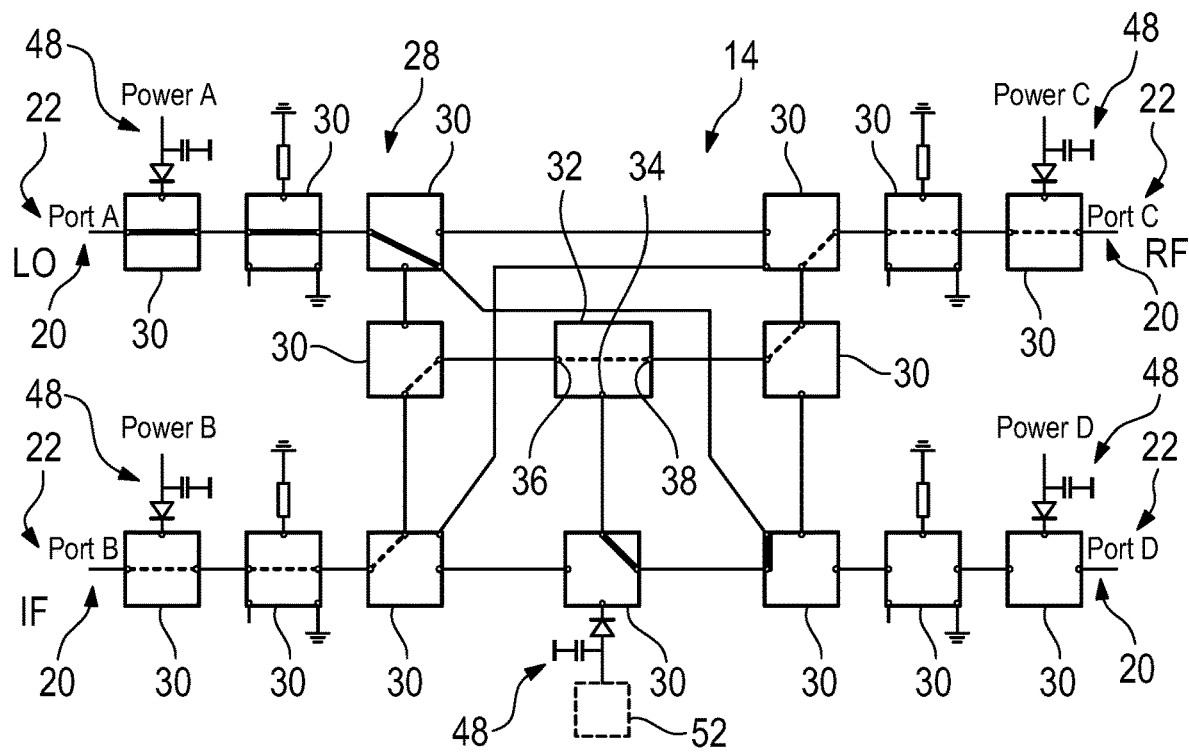
FIG. 7 shows the schematic overview of the automated calibration unit in an exemplary second switch state in a frequency converting mode.
Figure 8:
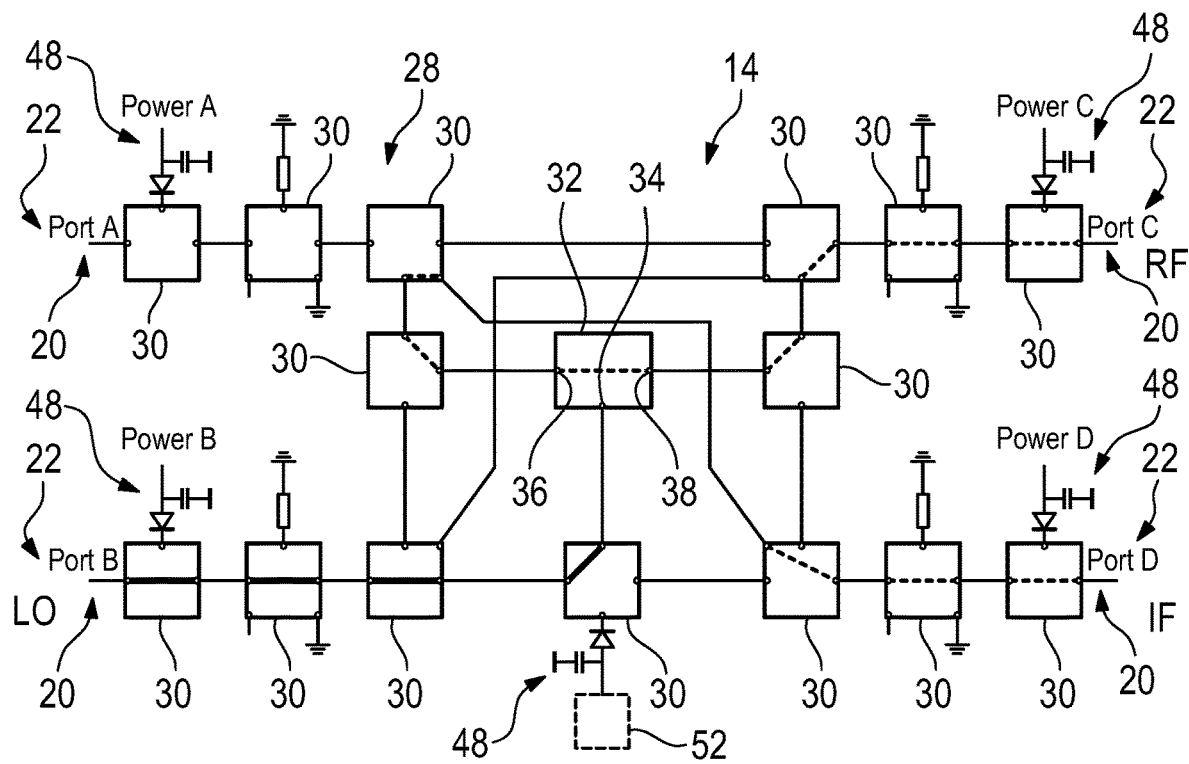
FIG. 8 shows the schematic overview of the automated calibration unit in an exemplary third switch state in a frequency converting mode.

In FIGS. 6 to 8, three different switch states of the automated calibration unit 14 which belong to a frequency converting mode as the frequency conversion circuit 32 is connected with the respective ports 20, namely the regular ports 22.

These FIGURES show that the several ports 20, namely the regular ports 22, can be selectively connected with the frequency conversion circuit 32 in different dedicated arrangements.

In FIG. 6, the ports 20 labelled with Port A and Port C are connected to the second and third ports 36, 38 of the frequency conversion circuit 32, whereas the port 20 labelled with Port B is connected with the first port 34 of the frequency conversion circuit 32, namely the LO port.

Accordingly, the port 20 labelled with Port B provides the local oscillator (LO) signal that is used by the frequency conversion circuit 32 to down-convert the RF signal provided by the port 22 labelled with Port A such that the IF signal is forwarded to the port 22 labelled with Port C or rather to up-convert the IF signal provided by the port 22 labelled with Port C such that the RF signal is forwarded to the port 22 labelled with Port A.

In FIG. 7, the ports 20 labelled with Port B and Port C are connected to the second and third ports 36, 38 of the frequency conversion circuit 32, whereas the port 20 labelled with Port A is connected with the first port 34 of the frequency conversion circuit 32, namely the LO port.

Accordingly, the port 20 labelled with Port A provides the local oscillator (LO) signal that is used by the frequency conversion circuit 32 to down-convert the RF signal provided by the port 22 labelled with Port C such that the IF signal is forwarded to the port 22 labelled with Port B or rather to up-convert the IF signal provided by the port 22 labelled with Port B such that the RF signal is forwarded to the port 22 labelled with Port C.

In FIG. 8, the ports 20 labelled with Port C and Port D are connected to the second and third ports 36, 38 of the frequency conversion circuit 32, whereas the port 20 labelled with Port B is connected with the first port 34 of the frequency conversion circuit 32, namely the LO port.

Accordingly, the port 20 labelled with Port B provides the local oscillator (LO) signal that is used by the frequency conversion circuit 32 to down-convert the RF signal provided by the port 22 labelled with Port C such that the IF signal is forwarded to the port 22 labelled with Port D or rather to up-convert the IF signal provided by the port 22 labelled with Port D such that the RF signal is forwarded to the port 22 labelled with Port C.

Obviously, several different dedicated port arrangements can be used in the frequency converting mode.

Figure 3:
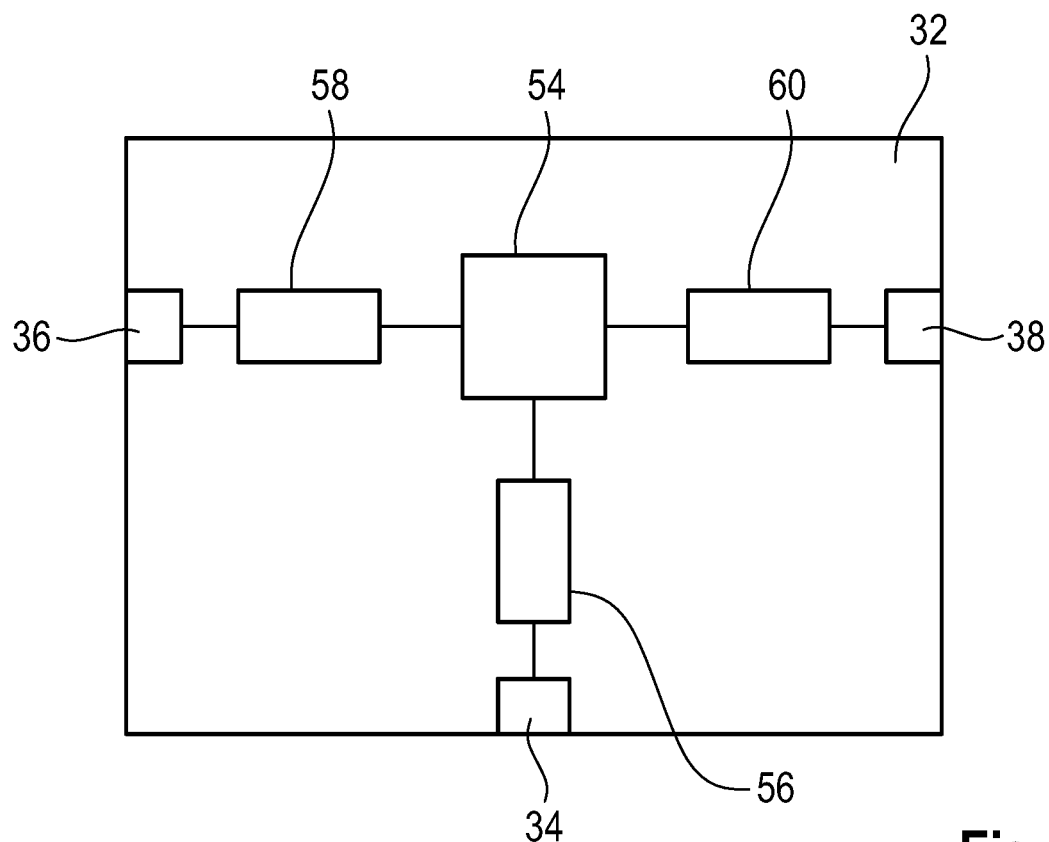
FIG. 3 shows a detailed view of the frequency conversion circuit according to the present disclosure, which is used in the automated calibration unit of FIG. 2.

The frequency conversion circuit 32 is shown in FIG. 3 in more detail. FIG. 3 illustrates the frequency conversion circuit 32 for use in automated calibration.

The frequency conversion circuit 32 comprises a reciprocal device 54, e.g., a mixer. The reciprocal device 54 may comprise a diode, a transistor or a thermal element. Thus, the reciprocal device 54 is non-linear and reciprocal in amplitude and phase. Moreover, the reciprocal device 54 non-linearly creates at least one higher order frequency component that is different to the intermediate frequency signal or the radio frequency signal As already discussed above, the frequency conversion circuit 32 has three ports 34, 36, 38. The first port 34 is used to connect the frequency conversion circuit 32 to a line processing a local oscillator signal. Hence, the first port 34 is an LO-port. The other two ports 36, 38 are input and output ports of the frequency conversion circuit 32, wherein two different frequency signals are processed by the respective ports 36, 38, e.g. an IF signal and an RF signal. By means of example, the second port 36 processes a signal of lower frequency or intermediate frequency such that the second port 36 relates to an IF-port. The third port 38 processes a signal with higher frequency or radio frequency such that the third port 38 relates to an RF-port.

In addition, attenuators 56, 58 and 60 are provided between the respective ports 34, 36, 38 and the reciprocal device 54.

At least the attenuators 58, 60 associated with the second port 36 and the third port 38 have the same attenuation level, wherein a deviation of e.g. 5% or less may occur due to unavoidable imperfections. The attenuators 58, 60 allow suppressing harmonics that would convert down/up to the same RF/IF frequency and, thus, reduces measurement errors.

The attenuator 56 associated with the first port 34, particularly its value, might be chosen appropriately for matching purposes.

To ensure a wide operating frequency range at the respective ports 34, 36, 38, no frequency limiting devices such as diplexers, filters, baluns or amplifiers are used.

Generally, the automated calibration unit 14, particularly the switching circuit 28, is configured to allow each one of the ports 20 to be connected to another one of the ports 20, thereby providing a through connection via the frequency conversion circuit 32.

The configuration of the automated calibration unit 14 shown allows the use of a through or unknown through calibration standard via the frequency conversion circuit 32 for selected pairs of ports 20. The configuration of the automated calibration unit 14 shown also allows, by means of the switching circuit 28, each port 20 be connected, selectively, to one of the calibration standards 40. In order to provide any desired one of the possible connections of ports 20, a control circuit 62 or rather processing circuit can be used as shown in FIG. 1. The automated calibration unit 14 may have a corresponding interface 64. Alternatively, the test and measurement instrument 12 has a control interface 66 via which the automated calibration unit 14, particularly the switching circuit 28, can be controlled in order to select the appropriate switch state.

In any case, respective control instructions (e.g., from the test and measurement instrument 12 or rather the external control circuit 62 or rather processing circuit) can be received, which are used to control the switching circuit 28, for example each of the switching circuit portions 30, respectively.

Figure 4:
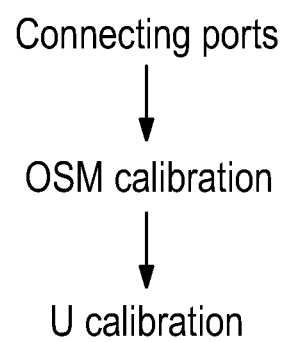
FIG. 4 shows an overview that illustrates the steps of a method according to the present disclosure.

FIG. 4 illustrates a method of performing calibration of the test and measurement instrument 12 by means of the automated calibration unit 14.

At the beginning, the respective ports 18 of the test and measurement instrument 12 are connected with the ports 20 of the automated calibration unit 14, thereby establishing the system 10 shown in FIG. 1.

Then, the calibration may start.

In a first calibration step, an OSM calibration (of at least one of the ports 18 of the test and measurement instrument 12) is performed by subsequently connecting a respective port 20 of the several ports 20 of the automated calibration unit 14 with the open calibration standard 40, the short calibration standard 42 and the match calibration standard 44. The different calibration standards 40 are connected with the respective port 20 by means of the switching circuit 28 of the automated calibration unit 1214 Hence, the switching circuit 28, for example a switching circuit portion 30 associated with the calibration standards 40, has three different switch states for calibrating the respective port 18 of the test and measurement instrument 12. The respective port 18 is connected with the respective port 20 of the automated calibration unit 14. For each of the respective calibration standards 40, measurements are performed for required frequencies in order to obtain the measurements errors.

In a second calibration step, the respective port 20 and another port 20 of the automated calibration unit 14 is connected with the frequency conversion circuit 32 of the automated calibration unit 14 by means of the switching circuit 28, for example at least two switching circuit portions 30. As mentioned above, the frequency conversion circuit 28 is non-linear and reciprocal in amplitude and phase. In the respective switch state, in which the through connection is established via the frequency conversion circuit 28, an unknown through calibration (U calibration) is performed by using the frequency conversion circuit 32 that is used as an unknown through calibration standard. An amplitude and phase relation is established between the respective ports 20, e.g. the ports 18 of the test and measurement instrument 12. Again, for each of the required through connections, measurements can be performed for required frequencies.

Hence, all of the ports 18 of the test and measurement instrument 12 are calibrated with regard to the UOSM calibration.

Accordingly, the method is for performing calibration of the test and measurement instrument 12, e.g. the vector network analyzer (VNA), in an automated manner.

To sum up, the calibration is performed using the UOSM calibration method. The Open, Short, Match (OSM) and the Unknown Trough (U) are provided by the automatic (or automated) calibration unit 14.

After the OSM calibration step at the ports 18, the second calibration step is performed to establish the amplitude and phase relation between the ports 18 to correctly measure the frequency conversion characteristic of the test and measurement instrument 12. This is achieved by the use of the reciprocal calibration circuit 32 as the unknown through standard to complete the UOSM calibration.

Generally, an absolute calibration performed for a low frequency port can be transferred to a high frequency port. More precisely, an absolute power calibration transfer may be done.

Accordingly, a system error correction is determined for a port 18 for low frequency signals of the test and measurement instrument 12, e.g. a low frequency port or rather an intermediate frequency (IF) port of the test and measurement instrument 12. Moreover, a system error correction is determined for a port 18 for high frequency signals of the test and measurement instrument 12, e.g. a high frequency port or rather a radio frequency (RF) port of the test and measurement instrument 12. This can be done by means of the automated calibration unit 14

Then, the frequency conversion circuit 32 is connected with the test and measurement instrument 12. Alternatively, the automated calibration unit 14 having the frequency conversion circuit 32 is switched into the other mode, namely from the non-frequency converting mode into the frequency converting mode such that the frequency conversion circuit 32 is connected with the respective ports 18 of the test and measurement instrument 12.

Afterwards, an unknown through measurement is performed by means of the frequency conversion circuit 32 that is connected with the test and measurement instrument 12, thereby obtaining a measurement result.

Furthermore, an absolute power measurement at the low frequency port of the test and measurement instrument 12 is performed, wherein a first absolute amplitude normalization factor associated with the low frequency port of the test and measurement instrument 12 is obtained. The absolute power measurement can be done by means of a power meter since the power measurement is performed at the low frequency port. Hence, an accurately determined absolute amplitude normalization factor is obtained for the low frequency port.

The absolute amplitude normalization factor for the low frequency port as well as the measurement result obtained can be used to transfer the absolute amplitude normalization factor for the low frequency port such that an absolute amplitude normalization factor for the high frequency port is obtained. In other words, the absolute amplitude normalization factor for the low frequency port is transferred to the absolute amplitude normalization factor for the high frequency port by using the measurement result and the absolute amplitude normalization factor for the low frequency port accurately determined by means of the absolute power measurement performed.

In some embodiments, the measurement result obtained in the unknown through measurement corresponds to a ratio of the normalization factors associated with the low frequency port and the high frequency port of the test and measurement instrument 12.

Generally, the scattering parameters can be derived from $$S = B \cdot A^{-1},$$

wherein the matrices A and B can be obtained from uncorrected measurement values $am_{ij}$ and $bm_{ij}$ using $Q^{(i)}$ matrices that are defined as follows:

$$\begin{pmatrix} a_{ij} \\ b_{ij} \end{pmatrix} = Q^{(i)} \begin{pmatrix} am_{ij} \\ bm_{ij} \end{pmatrix}$$

$$A = \begin{pmatrix} a_{11} & a_{12} \\ a_{21} & a_{22} \end{pmatrix} \text{ and } B = \begin{pmatrix} b_{11} & b_{12} \\ b_{21} & b_{22} \end{pmatrix}$$

The Q matrices relate to the system error correction determined for the ports 18 of the test and measurement instrument 12 separately such that a one-port system approach can be used for determining the respective Q matrices. In some embodiments, the one-port error correction for port i, e.g. by means of OSM calibration, can be written as follows:

$$Q^{(i)} = \begin{pmatrix} 1 - \dfrac{D^{(i)} \cdot S^{(i)}}{RT^{(i)}} & S^{(i)}/RT^{(i)} \\ -D^{(i)}/RT^{(i)} & 1/RT^{(i)} \end{pmatrix}$$

The entries of the Q matrices concern error terms associates with directivity ("D"), source match ("S") and reflection and transmission tacking ("RT").

The Q matrices for port i have been normalized by a factor $1/c_i = 1/F^{(i)}$. When performing the absolute power meter measurement, the absolute amplitude of the wave quantities is derived, namely the absolute value of $c_i$.

When the unknown through measurement is performed, namely the 2-port UOSM calibration of the system error correction, the ratio of the normalization factors can be determined, namely $p_{rel} = c_2/c_1$ between port 1 and port 2 of the test and measurement instrument 12, which are at different frequencies, namely low frequency and high frequency. Therefore, the reciprocal frequency conversion circuit 32 is used.

For instance, port 2 is a rectangular wave guide port and port 1 in a coaxial frequency range at much lower frequency.

Doing a UOSM calibration between both ports 18 of the test and measurement instrument 12 using the frequency conversion circuit 32 the ratio $p_{rel}$ can be determined.

Afterwards, a power meter measurement on port 1 is done, which allows to determine the absolute value of $c_1$.

Finally, the absolute value of $c_2$ can calculated by $|c_2| = |p_{rel}||c_1|$. Hence, the wave quantities at port 2, e.g. at mm-wave frequencies, can be corrected in amplitude without doing a dedicated power meter measurement on that port, namely port 2. In other words, an absolute power calibration transfer has been done or rather the absolute power calibration done at the low frequency port by means of the absolute power measurement is transferred to the higher frequency port.

Certain embodiments disclosed herein, for example the respective module(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. An automated calibration unit for calibrating a test and measurement instrument,
the automated calibration unit having several ports for connecting with respective ports of the test and measurement instrument to be calibrated;
the automated calibration unit having a frequency conversion circuit that is non-linear and reciprocal in amplitude and phase;
the automated calibration unit having at least one switching circuit with several switch states;
the automated calibration unit being configured to selectively connect each one of the several ports to another one of the several ports depending on the switch state of the switching circuit, thereby providing a through connection via the frequency conversion circuit; and
the automated calibration unit being configured to selectively connect each one of the several ports to at least one of several calibration standards respectively depending on the switch state of the switching circuit.

2. The automated calibration unit of claim 1, wherein the switching circuit is configured to selectively connect one of the several ports to a local oscillator port of the frequency conversion circuit.

3. The automated calibration unit of claim 1, wherein the frequency conversion circuit has a radio frequency (RF) port and an intermediate frequency (IF) port, and wherein the frequency conversion circuit that is non-linear and reciprocal in amplitude and phase with respect to a signal transmission from the radio frequency (RF) port to the intermediate frequency (IF) port and vice versa.

4. The automated calibration unit of claim 1, wherein the frequency conversion circuit has a down-conversion operational state and an up-conversion operational state.

5. The automated calibration unit of claim 1, wherein the automated calibration unit comprises a detector circuit, wherein the automated calibration unit is configured to perform a power calibration of the test and measurement instrument based on information obtained from the detector circuit.

6. The automated calibration unit of claim 1, wherein the automated calibration unit has a feedback line that is configured to provide a feedback.

7. The automated calibration unit of claim 1, wherein the several calibration standards are an open calibration standard, a short calibration standard and a match calibration standard.

8. The automated calibration unit of claim 1, wherein the switching circuit is configured to automatically switch between the different switch states in order to selectively connect a respective port of the several ports with the several calibration standards one after the other subsequently, thereby ensuring an Open Short Match (OSM) calibration.

9. The automated calibration unit of claim 8, wherein the respective port is connected to another of the several ports via the frequency conversion circuit, thereby establishing the through connection between the respective port and the another port.

10. The automated calibration unit of claim 1, wherein the automated calibration unit has a single housing that encompasses the frequency conversion circuit, the switching circuit and the several calibration standards.

11. The automated calibration unit of claim 1, wherein the frequency conversion circuit comprises an input port for receiving an input signal and an output port for outputting an output signal.

12. The automated calibration unit of claim 11, wherein a respective attenuator is associated with the input port and the output port, the respective attenuators having the same attenuation level such that harmonics are suppressed that would convert up or down to the same frequency of the output signal.

13. A frequency conversion circuit for use in automated calibration, the frequency conversion circuit having three ports,
a first port being a local oscillator port configured to receive a local oscillator signal;
a second port and a third port being configured to process an intermediate frequency signal and a radio frequency signal, respectively;
the frequency conversion circuit being non-linear and reciprocal in amplitude and phase; and
a respective attenuator being associated with each of the second port and the third port, the respective attenuators having the same attenuation level such that harmonics are suppressed that would convert up or down to the same frequency of the intermediate frequency signal and the radio frequency signal, respectively.

14. The frequency conversion circuit of claim 13, wherein the frequency conversion circuit has a reciprocal device that non-linearly creates at least one higher order frequency component that is different to the intermediate frequency signal or the radio frequency signal.

15. The frequency conversion circuit of claim 13, wherein a further attenuator is provided that is associated with the first port.

16. A method of performing calibration of a test and measurement instrument by means of an automated calibration unit having several ports, comprising:
connecting ports of the automated calibration unit with ports of the test and measurement instrument to be calibrated;
in a first calibration step, performing an Open Short Match (OSM) calibration by subsequently connecting a respective port of the several ports of the automated calibration unit with an open calibration standard, a short calibration standard and a match calibration standard, wherein the different calibration standards are connected with the respective port by means of a switching circuit of the automated calibration unit; and
in a second calibration step, connecting the respective port and another port of the automated calibration unit with a frequency conversion circuit of the automated calibration unit by means of the switching circuit, wherein the frequency conversion circuit is non-linear and reciprocal in amplitude and phase, and performing an unknown through calibration by using the frequency conversion circuit that is used as an unknown through calibration standard.

17. The method of claim 16, wherein the switching circuit subsequently connects the different calibration standards with the respective port automatically in the first calibration step, and wherein the respective port is connected with the frequency conversion circuit automatically in the second calibration step.

18. The method of claim 16, wherein an absolute calibration performed for a low frequency port is transferred to a high frequency port.

* * * * *